United States Patent [19]

Yoshino

[11] Patent Number: 5,004,382
[45] Date of Patent: Apr. 2, 1991

[54] MIST-SPOUTING TYPE DRILLING DEVICE

[75] Inventor: Yousuke Yoshino, Kawagoe, Japan

[73] Assignee: Yoshino Seiki Inc., Kawagoe, Japan

[21] Appl. No.: 492,306

[22] Filed: Mar. 7, 1990

Related U.S. Application Data

[63] Continuation of Ser. No. 318,136, Mar. 2, 1989, abandoned.

[30] Foreign Application Priority Data

| Mar. 3, 1988 | [JP] | Japan | 63-50423 |
| Apr. 2, 1988 | [JP] | Japan | 63-44829[U] |
| Apr. 2, 1988 | [JP] | Japan | 63-44830[U] |
| Dec. 5, 1988 | [JP] | Japan | 63-158388[U] |
| Dec. 6, 1988 | [JP] | Japan | 63-158637[U] |

[51] Int. Cl.$^5$ .............................. B23B 51/06
[52] U.S. Cl. ............................. 408/60; 175/320;
                                          175/69; 408/60; 408/204; 125/20
[58] Field of Search ............ 409/135, 136; 51/267;
                                              408/703; 75/320

[56] References Cited

U.S. PATENT DOCUMENTS

| 111,167 | 1/1871 | Bauman et al. | 408/59 |
| 2,413,084 | 12/1946 | Sommer et al. | 408/59 |
| 2,452,268 | 10/1948 | Schumann | 29/DIG. 83 X |
| 2,845,823 | 8/1958 | Carlstedt | 408/56 |
| 2,870,933 | 1/1959 | Jahnke | |
| 2,946,244 | 7/1960 | Maynard | 279/20 X |
| 3,049,843 | 8/1962 | Christensen | 125/20 X |
| 3,096,668 | 7/1963 | Maynard | 408/59 |
| 3,153,885 | 10/1964 | Keller et al. | 408/59 X |
| 3,421,392 | 1/1969 | Bangerter et al. | |
| 3,478,843 | 11/1969 | Eckardt | 408/61 |
| 3,487,748 | 1/1970 | Grage | 408/59 X |
| 3,593,800 | 7/1971 | Hutchinson | 175/69 X |
| 3,661,299 | 2/1971 | Brisk et al. | 408/59 |
| 4,032,250 | 6/1977 | Lavalle | 408/59 |
| 4,437,525 | 3/1984 | O'Hanlon et al. | 175/218 |
| 4,625,707 | 12/1986 | Whittaker | 408/57 X |

FOREIGN PATENT DOCUMENTS

| 2436023 | 2/1976 | Fed. Rep. of Germany . |
| 2913501 | 10/1980 | Fed. Rep. of Germany ........ 125/20 |
| 58-49207 | 3/1983 | Japan . |
| 58-107807 | 6/1983 | Japan . |
| 58-181510 | 12/1983 | Japan . |
| 58-188142 | 12/1983 | Japan . |
| 59-30645 | 2/1984 | Japan . |
| 60-114812 | 8/1985 | Japan . |
| 60-201906 | 10/1985 | Japan . |
| 60-201908 | 10/1985 | Japan . |
| 60-262608 | 12/1985 | Japan . |
| 61-2908 | 1/1986 | Japan . |
| 61-40969 | 2/1986 | Japan . |

Primary Examiner—Z. R. Bilinsky
Assistant Examiner—Robert Schultz
Attorney, Agent, or Firm—Oblon, Spivak, McClelland, Maier & Neustadt

[57] ABSTRACT

Atomized water is produced by an atomizer mounted on a drilling device and introduced through a mist flow passage formed in a hollow drill. By applying the atomized water flowing from the atomizer to a cutting bit at the leading end of the drill through the mist flow passage, the cutting bit heated and reaching a high temperature in drilling is cooled. Thus, a rigid material of concrete or the like can be efficiently drilled without being stained with wetting.

6 Claims, 6 Drawing Sheets

MIST-SPOUTING TYPE DRILLING DEVICE

This application is a continuation of application Ser. No. 7/318,136 field on Mar. 2, 1989.

BACKGROUND OF THE INVENTION

1. Field of the Invention

This invention relates to a drilling device for boring holes in a rigid material of a stone, concrete or the like while applying atomized water to the cutting bit of a drill, and more particularly to a mist-spouting type drilling device capable of cooling the cutting bit by spouting atomized water through a mist passage in the drill shank so as to efficiently bore a hole in the rigid material.

2. Description of the Prior Art

When boring a hole in a rigid material such as a stone and concrete by use of a drill with a cutting bit made from ultra-hard abrasive grains including diamond grains or the like, the cutting bit is heated and reaches as high as about 300° C. to 600° C. due to the heat of rolling friction caused between itself and the rigid material. The frictional heat generated in drilling increases remarkably the wear rate of the cutting bit thereby to shorten the life of the drill.

In order to prevent the cutting bit of the drill from reaching a high temperature in drilling, there have conventionally been employed various methods for cooling the cutting bit by use of a spout of water or air. In these methods, a hollow drill having an axial fluid passage is used and a cooling fluid such as water and air is spouted from the leading end of the drill through the axial fluid passage, thereby cooling effectively the cutting bit of the drill.

In the conventional drilling devices, a water-cooling method using water as coolant has an effect of sufficiently cooling the cutting drill. However, it entails a disadvantage in that the material to be bored and the circumferences thereof are considerably stained with the water spouted from the drill. If a hood cover encircling the drill is used for recovering the water spouted from the leading end of the drill, it adds to the size and complexity of the drilling device and renders the handling of the device difficult.

An air-cooling method of the drilling device, in which air is spouted from the leading end of the drill, cannot be expected to sufficiently cool the cutting bit. Furthermore, according to this method cutting chips produced in drilling are carried about in the air. Thus, an attempt has been made to prevent the cutting chips from being scattered in the air by use of an encircling cover for collecting cutting chips. It nevertheless suffers from operational inefficiency.

There has been a need for a drilling device having the distinctive features of the conventional drilling devices of the water-cooling type and air-cooling type which have opposite effects to other—namely, a drilling device having an effect of efficiently cooling the cutting bit and being easy to handle.

OBJECTS OF THE INVENTION

An object of this invention is to provide a drilling device having an excellent effect of cooling a cutting bit in drilling so as to efficiently bore a hole in a rigid material of concrete or the like and being easy to handle.

Another object of this invention is to provide a portable drilling device using a hollow drill, which is capable of spouting atomized water from the leading end of the drill to efficiently cool the drill and enjoys high workability of drilling by preventing the material to be bored and the circumferences thereof from being stained with wetting.

A further object of this invention is to provide a drilling device provided in a drill with a mist flow passage for introducing and applying atomized water to the cutting bit of the drill, which has a structure capable of preventing dew condensation of the atomized water in the mist passage and spouting the atomized water immediately after the device begins to operate.

SUMMARY OF THE INVENTION

To attain the objects described above, the drilling device according to this invention comprises a rotary drill having at least one mist flow passage, drill driving means for rotating the drill, and atomizing means for producing and introducing atomized water into the mist flow passage of the drill.

By applying the atomized water fed through the mist flow passage to a cutting bit at the leading end of the rotating drill, the cutting bit in rotation which generates heat in drilling due to rotating friction caused between itself and the rigid material to be bored can be effectively cooled, as some of the atomized water is evaporated when it comes in contact with the cutting bit which is at a high temperature so as to alleviate the frictional heat generated in drilling. Furthermore, cutting chips produced in boring the material are moderately moistened with the remaining atomized water which has not been evaporated. Hence, since the cutting chips are prevented from scattering in the air, the work of drilling becomes easy.

By shortening the length from the atomizing means to the outlet of the drill-, the atomized water is reluctant to be condensed to waterdrops. Therefore, the atomizing means may preferably be positioned as close to the inlet of the mist flow passage as possible.

The above and further objects and features of the invention will more fully appear from the following detailed description when the same is read in connection with the accompanying drawings It is to be expressly understood, however, that the drawings are for purpose of illustration only and is not intended as a definition of the limits of the invention.

DESCRIPTION OF THE PREFERRED EMBODIMENT

The First Embodiment

Figure 1:
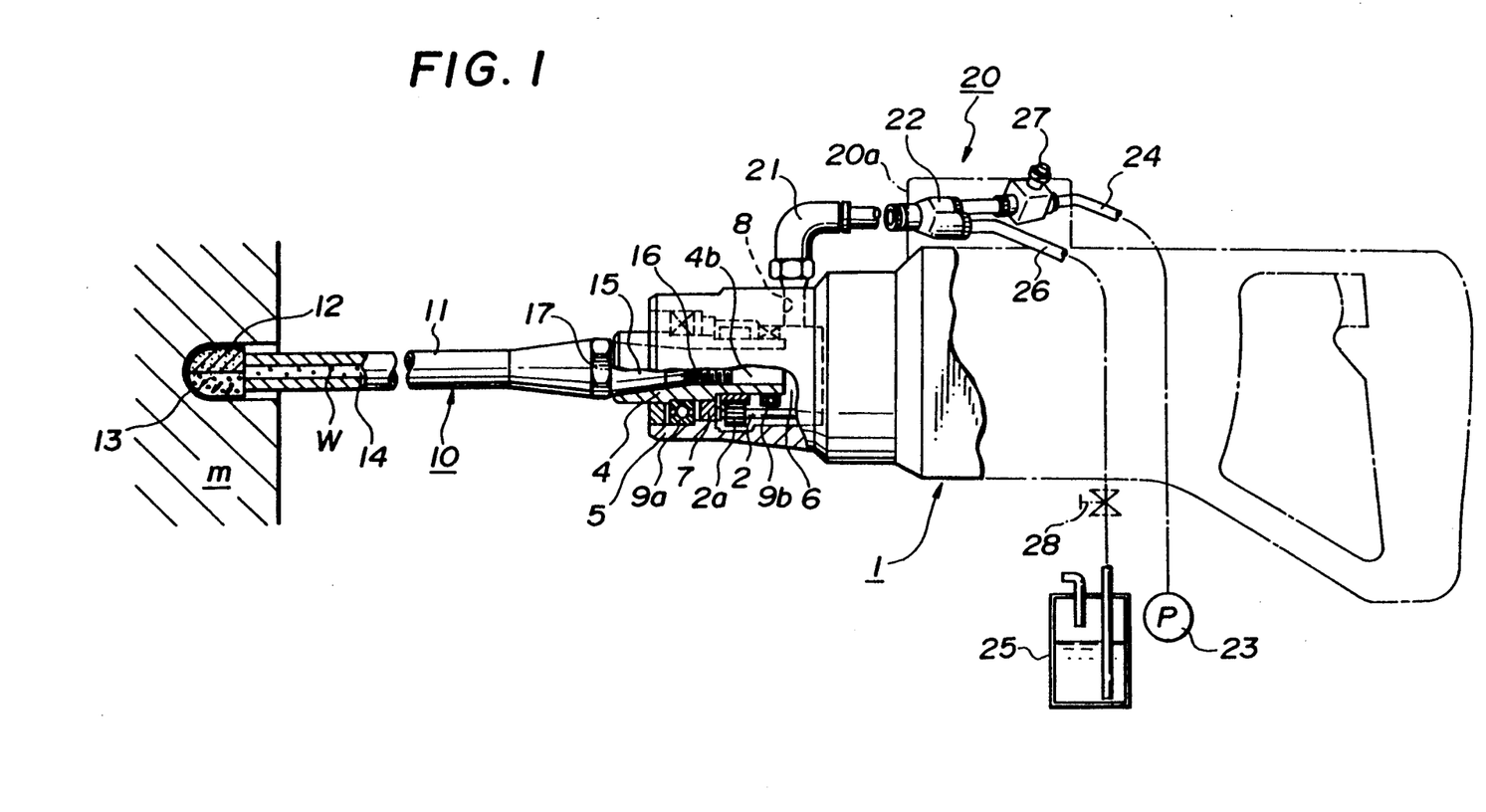
FIG. 1 is a partially sectional view showing one preferred embodiment of the drilling device according to this invention.
Figure 2:
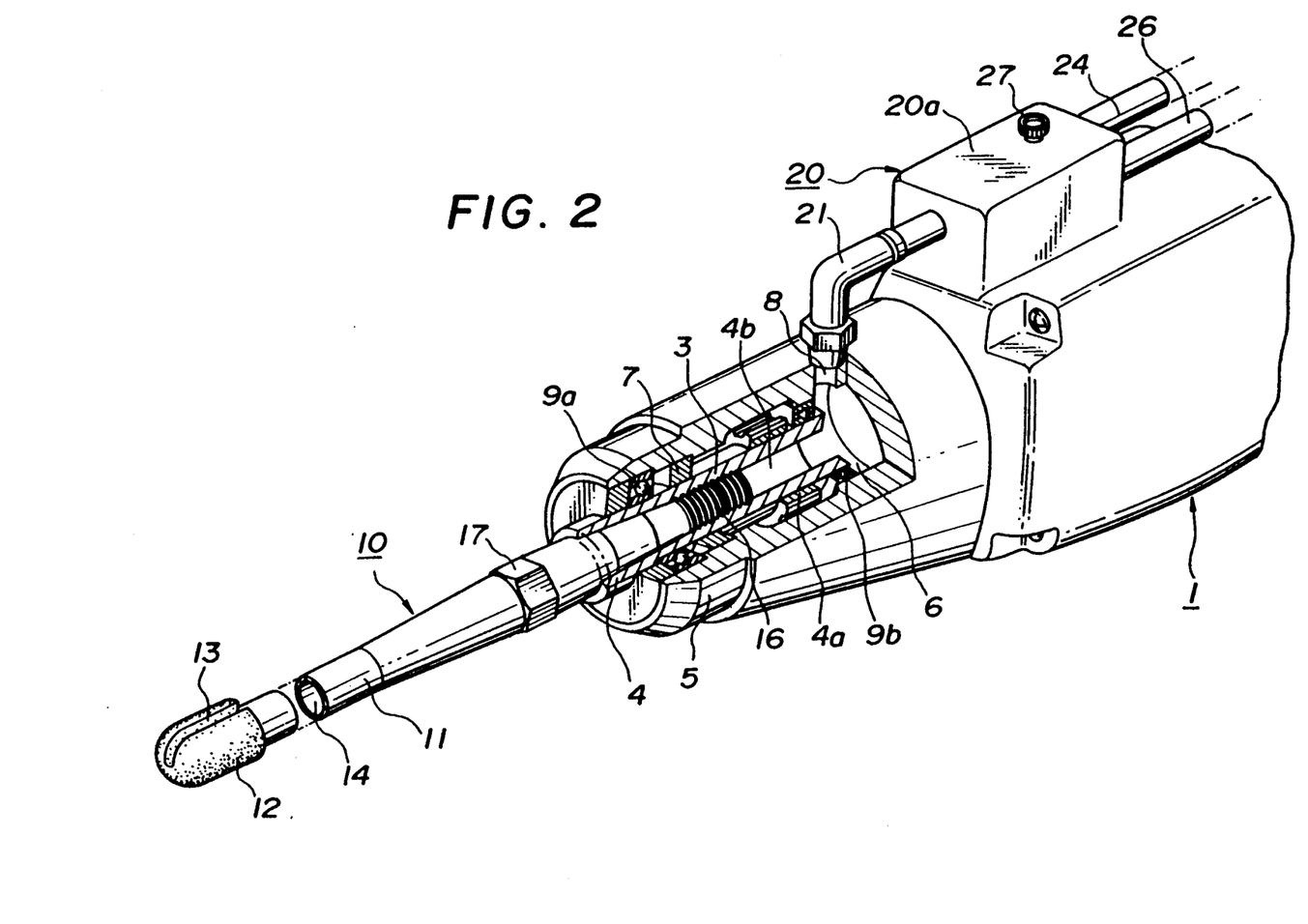
FIG. 2 is a partially cutaway perspective view of FIG. 1.
Figure 3:
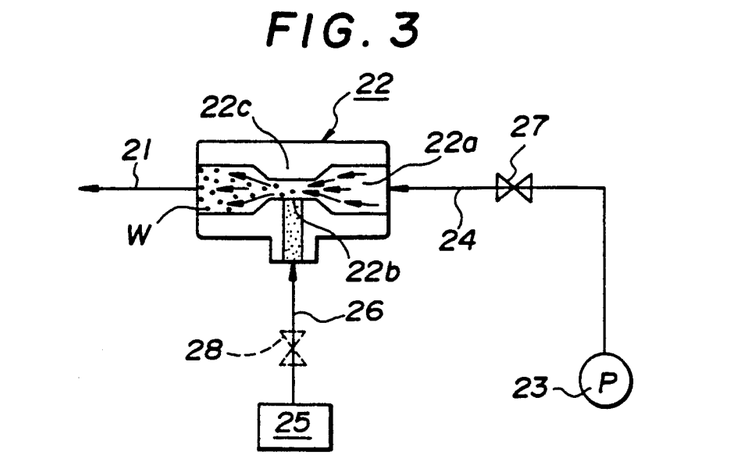
FIG. 3 is a schematically explanatory diagram showing one example of atomizing means used in this invention.

The mist-spouting type drilling device illustrated as the first embodiment of this invention in FIGS. 1 through 3 is used for boring narrow holes in a concrete material m. In this embodiment, the drilling device is a so-called portable electric drill and comprises a drill driving means (motor body) 1 having an electric motor (not shown) and a rotary drill 10 which is detachably attached to the drill driving means 1.

The rotary drill 10 is retained by a drill holding portion 3 (FIG. 2) formed on a part of a rotating shaft 4 which is connected via gears 2a, 4a to a rotary shaft 2 of the electric motor. In the rotating shaft 4 there is formed a threaded axial hole 4b so that the rotary drill 10 can be in screwing engagement with and firmly held by the rotating shaft 4.

Between a front shell 5 of the drill driving means 1 and the rotating shaft 4 there is defined a mist chamber 6 sealed airtightly by a seal bearing 7. The mist chamber 6 communicates with the threaded axial hole 4b in the rotating shaft 4. Inside the front shell 5 there is formed a mist supplying hole 8 open to the mist chamber 6. Thus, a mist supplying passage is formed from the mist supplying hole 8 to the threaded axial hole 4b in the rotating shaft 4 via the mist chamber 6. In the drawings reference numerals 9a, 9b denote bearings for the rotating shaft 4. Though the drill holding means of a screw chuck type is used in this embodiment, it may of course be of any type. The other elements in the drilling device are not limited to these in the illustrated structure.

The rotary drill 10 comprises a hollow drill shank 11 and a cutting bit 12 provided at the leading end of the drill shank 11. The cutting bit 12 is formed in a substantially cylindrical shape having a hemispherical leading end by sintering ultra-hard abrasive grains (including, for example, diamond grains so that a rigid material m such as concrete can be bored. The cutting bit 12 has a slit 13 which comprehends the axis of the cutting bit 12 so as to form cutting edges at the intersection between the walls defining the slit 13 and the outer peripheral surface of the cutting bit 12. The drill shank 11 has a mist flow passage 14 which passes along the axis of the shank and opens to the slit 13. In the drawings, reference numeral 15 denotes a fitting portion having thread means 16 which comes into screwing engagement with the drill holding portion 3 of the drill driving means 1, and numeral 17 denotes a polygonal hook portion to which a tool such as a spanner is fitted to readily rotate the rotary drill 10 relative to the drill holding portion 3.

When the rotary drill 10 is fitted to the drill holding portion 3, a mist course which is formed in the drill driving means 1 and extends from the mist supplying hole 8 to the threaded axial hole 4b in the rotating shaft 4 via the mist chamber 6 is connected with the mist flow passage 14 formed in the rotary drill 10.

To the mist supplying hole 8 formed in the front shell 5 of the drill driving means 1 through a joint pipe 21, there is connected atomizing means 20 for producing atomized water. As termed here, "atomized water" means a group of water particles (a mist of waterdrops w) so fine as to float in the air. As illustrated in FIG. 3, the atomizing means 20 comprises a spraying nozzle 22 having an air inlet port 22a connected to an air compressor or air pump (P) 23 through a feed air pipe 24, and a water supply port 22b connected to a water supply means 25 through a feed water pipe 26. The spraying nozzle 22 is formed by disposing the water supply port 22b in an orifice portion 22c. Thus, the air supplied from the air compressor 23 into the air supply port 22a is increased in flow rate at the orifice portion 22c, with the result that the water supplied to the water supply port 22b is sucked up into the nozzle and is sprayed as a mist of waterdrops with the compressed air. The atomized water w discharged from the spraying nozzle 22 through the joint pipe 21 is sent to the cutting bit 12 at the leading end of the rotary drill 10 through the mist course constituted by the mist supplying passage in the driving drill 11 driving means 1 and the mist flow passage 14 in the rotary drill 10.

The atomized water w must be prevented from being completely evaporated or condensing into water when flowing through the mist course formed by the mist supplying passage and mist flow passage 14. This is because, if the atomized air condenses into water in the mist course, it entails the same disadvantage as suffered by the conventional water-cooling type drilling device.

In order to prevent the atomized water introduced into the mist course from being completely evaporated, the water and air to be supplied to the atomizing means 20 may be mixed in a suitable ratio. As such, a flow control valve 27 may preferably be provided on the feed air pipe 24 so as to control the flow quantity of the air to be supplied to the atomizing means. In this case, it is advisable to operate the drilling device beforehand in a tentative manner so that the atomized water spouted from the leading end of the drill can be regulated by controlling the flow control valve 27 to bring the optimum atomizing condition. In a case that the water is compulsorily supplied, a flow control valve 28 may be provided on the feed air pipe 24.

To alleviate dew condensation of the atomized water in the mist course formed by the mist supplying and flow passages, it is desirable to shorten the distance from the atomizing means 20 to the cutting bit 12 to the fullest possible extent. Hence, the atomizing means 20 may preferably be disposed near by the mist supplying hole 8 formed in the front shell 5 of the drill driving means 1 by shortening or omitting the joint pipe 21.

When boring a hole in a concrete material m with a cutting bit 12 made from ultra-hard abrasive grains including diamond grains, the cutting bit 12 reaches a high temperature over 500° C due to the frictional heat caused between itself and the rigid material. However, by applying the atomized water w to the cutting bit 12 by use of the mist spouting mechanism including the atomizing means 20 according to this invention, the cutting bit 12 which is driven to rotate by the rotating shaft 4 is effectively cooled as some of the atomized water w is evaporated to alleviate the frictional heat generated in drilling when the atomized water comes in contact with the cutting bit heated in drilling. Furthermore, cutting chips produced in drilling the material are moderately moistened with the remaining atomized water which has not been evaporated. Therefore, the cutting chips can be prevented from scattering in the air.

As a result of an experiment carried out using the drilling device of this invention for boring an anchor hole in a concrete material, it has been proved that the drilling device of this invention has a cutting efficiency substantially equal to that of the conventional water-cooling type drilling device. The experimental results of boring a hole in a concrete material by use of the drilling device of this invention and the conventional air-cooling type drilling device are shown in the following tables. This comparative experiment was performed by rotating a diamond cutting bit of 9.5mm in diameter at 8000 rpm.

| [Conventional air-cooling type drilling device] | | | | |
| --- | --- | --- | --- | --- |
| Depth of hole bored (mm) | 38.0 | 38.5 | 38.5 | 38.5 |
| Time required for drilling (sec) | 16 | 17 | 15 | 16 |
| [Mist-spouting type drilling device of this invention] | | | | |
| Depth of hole bored (mm) | 40.0 | 40.0 | 40.0 | 40.0 |
| Time required for drilling (sec) | 10 | 9 | 7 | 8 |

It is learnt from the table that, according to this invention, the cutting efficiency went up as much as about 50% even at the lowest, compared with the conventional type. That is, according to this invention there can be accomplished a drilling device which has good cooling efficiency substantially equal to that of the water-cooling type and is easy to handle like the air-cooling type.

Though in the illustrated embodiment the atomizing means 20 is retained on the drill driving means 1 in the state covered with a casing 20a so that the atomizing system employed in this invention can readily be applied to an ordinary drilling device of any type, it may be integrally incorporated inside the drill driving means 1.

The Second Embodiment

Figure 4:
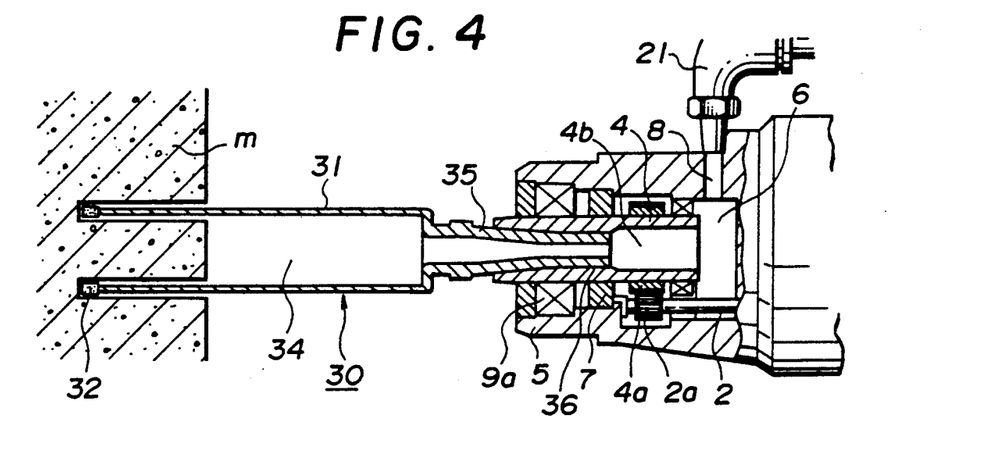
FIG. 4 is a schematic side view in section of a second embodiment of this invention.

FIG. 4 represents a second embodiment in which this invention is applied to a core drill 30 having an annular cutting bit of a large diameter with a large axial hollow space 34 so as to permit a large hole to be made in a concrete material or the like. When boring the concrete material, a cylindrical residue is left in the annular cutting bit of the core drill 30.

The core drill 30 comprises an annular shank 31 having an annular wall surface 33 of a large diameter, a ring-like cutting bit 32 attached to the leading end of the annular shank 31, and a fitting portion 35 having thread means 36 which is brought into screwing engagement with the drill holding portion 3 of the drill driving means 1. The axial hollow space 34 in the annular shank 31 serves as the mist flow passage through which the atomized water produced by the atomizing means noted above passes and is introduced into the cutting bit 32.

The Third Embodiment

Figure 5:
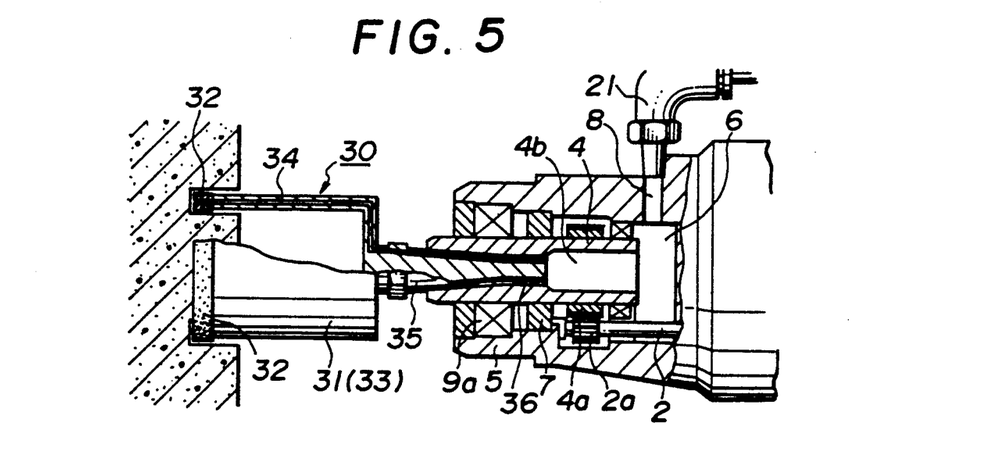
FIG. 5 is a schematic side view in section of a third another embodiment of the drilling device according to this invention.
Figures 6, 7:
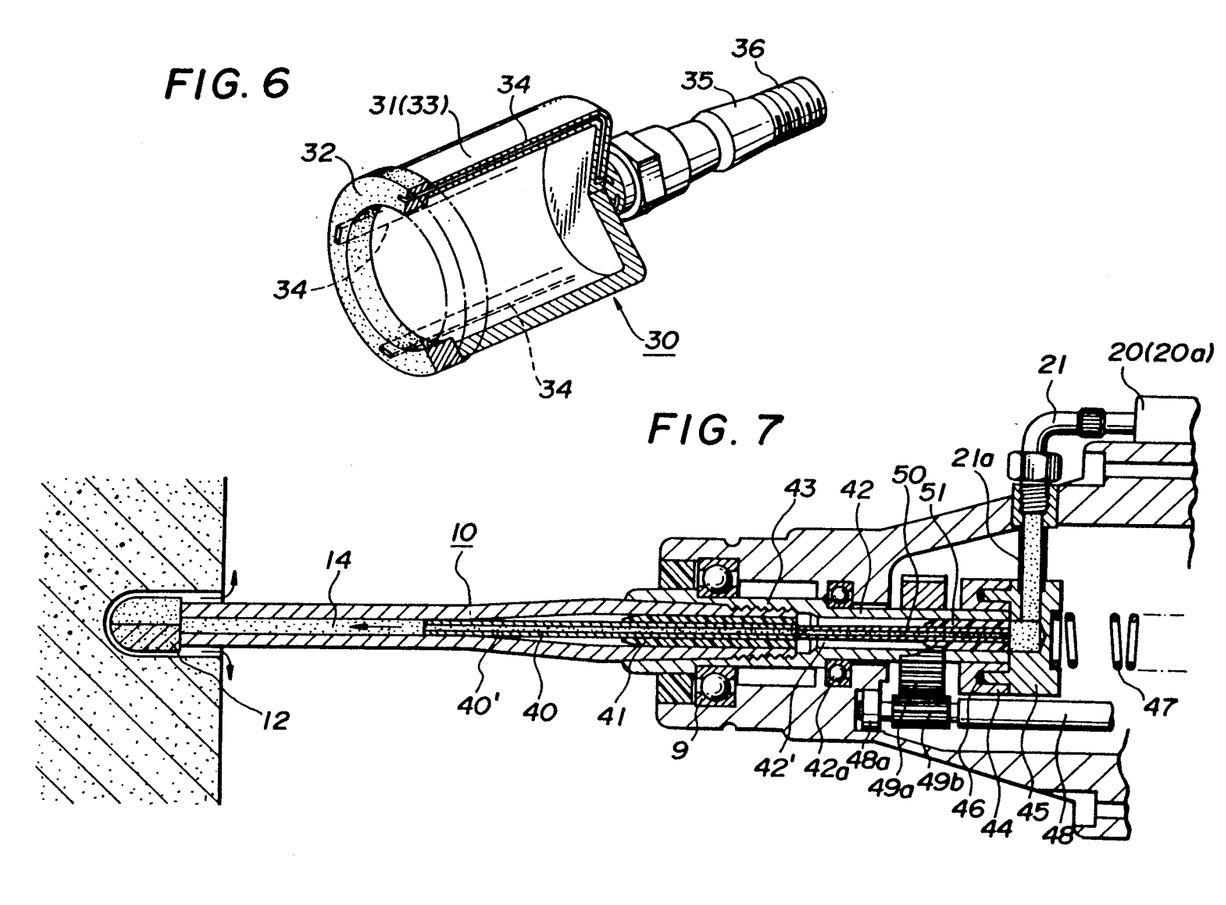
FIG. 6 is a partially cutaway perspective view of a core drill used in the drilling device of FIG. 5.
FIG. 7 is a sectional side view of a fourth embodiment of this invention.

As illustrated in FIGS. 5 and 6 as a third embodiment of this invention, a plurality of mist flow passages 34' may be formed in the annular wall surface 33 defining the annular shank 31. With this structure, the atomized water can be effectively supplied in comparison with the structure in which the axial hollow space 34 in the annular shank is used as the mist flow passage as shown in FIG. 4. The other elements in the embodiment of FIGS. 4 to 6 are substantially similar to those of the first embodiment and therefore, will not be described in detail again.

The Fourth Embodiment

When the drilling device of FIG. 1 is actually used, the atomized water is produced by the atomizing means 20 at the same time that the drill driving means 1 is driven, but the atomized water is only spouted out from the leading end of the drill 10 after a little while. In addition, when the drill driving means 1 stops, the spouting of the atomized water from the drill continues for a while after the drill driving means 1 comes to a halt. Such a time lag is caused owing to the capacity of the mist course constituted by the mist supplying passage in the drill driving means 1 and the mist flow passage 14 which serves to store the atomized water and, thus, would be removed by reducing the capacity of the mist course.

Figure 8:
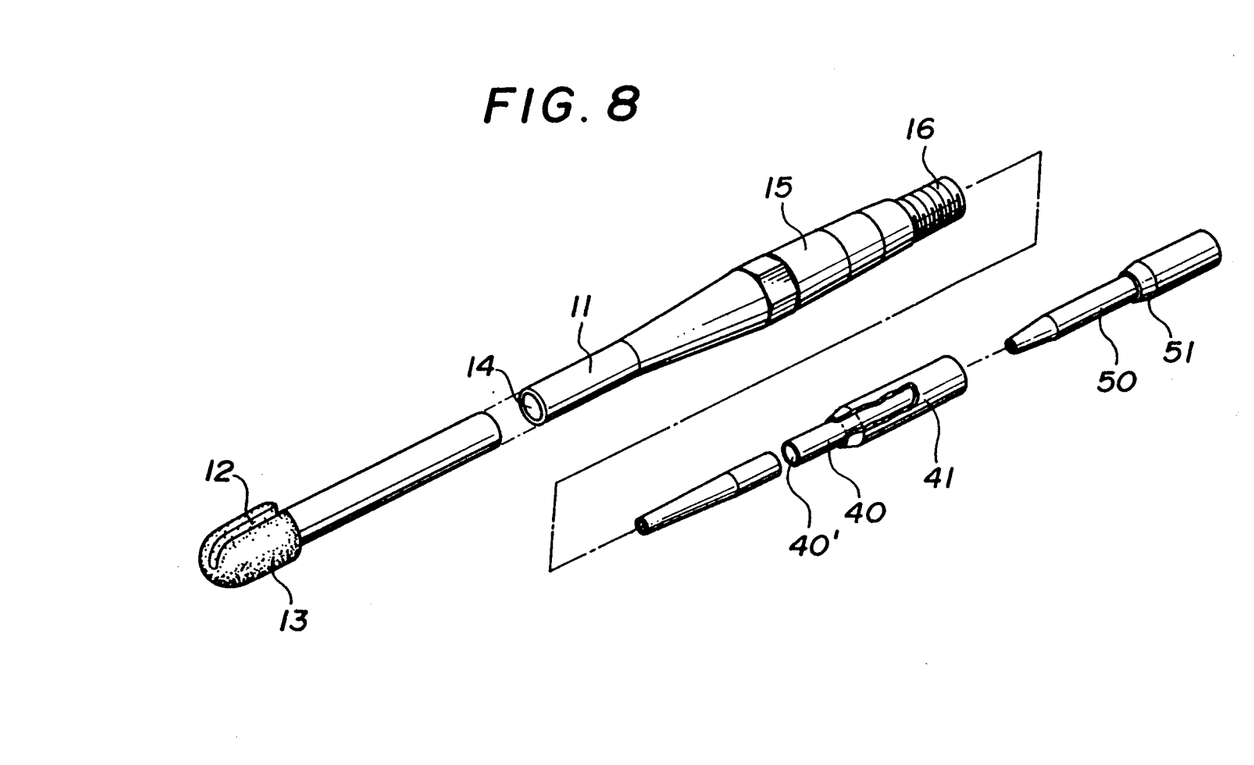
FIG. 8 is a perspective view in partially section of a throat nozzle unit used in the device of FIG. 7.

To reduce the capacity of the mist flow passage 14, a throat nozzle 40 may be inserted in the rotary drill 10 as illustrated in FIGS. 7 and 8. With the throat nozzle 40 inserted into the mist flow passage 14, the flow rate of the atomized air flowing through the mist course is rather increased. The throat nozzle 40 may be formed so as to occupy the mist flow passage 14 in the hollow drill shank 11 as large as possible. It is desirable to taper the throat nozzle 40 toward the leading end thereof as illustrated, so that, not only can the throat nozzle 40 be easily inserted into the mist flow passage 14, but also the flow rate of the atomized water is increased. In the drilling device actually manufactured on the basis of the structure having the throat nozzle 40, the atomized water has been spouted out from the leading end of the rotary drill 10 immediately after the drill driving means 1 is driven.

Furthermore, in the illustrated embodiment, the throat nozzle 40 is made sufficiently smaller in diameter than the mist flow passage 14, and partially covered with an elastic sleeve 41 so as to permit the throat nozzle 40 to be tightly inserted in the mist flow passage 14.

The embodiment illustrated in FIGS. 7 and 8 has a mist supplying path somewhat different in structure from that of the foregoing embodiments. The atomized water is introduced from the rear end of a rotary shaft 42 having an inner path 421 and a drill holding portion 43 at its leading end. The rotary shaft 42 is provided at the read end portion thereof with a coupling member 44 which is engaged with a counterpart coupling member 45 connected to the joint pipe 21 through an elastic connection pipe 21a. The coupling member 45 is urged toward the coupling member 44 of the rotary shaft 2 by a spring 47. Between the coupling members 44 and 45 there is interposed a seal ring 46 to maintain the mist supplying passage in the rotary shaft 42 airtight. In FIG. 7, reference numeral 48 denotes a driving shaft of a motor (not shown) which is in connection with the rotary shaft 42 of the by means of gears 49a and 49b, and numerals 42a and 42b denote bearings for the rotary shaft 42 and the driving shaft 48, respectively. In this drawing, the elements indicated by like reference numerals with respect to those of the foregoing embodiments have analogous structures and functions to those of the foregoing embodiments.

In the modified embodiment seen in FIG. 7, also in the inner path 42' of the rotary shaft 42, a further throat nozzle 50 like the aforementioned throat nozzle 40 is firmly inserted inside the rotary shaft 42. If the inner diameter of the rotary shaft 42 is sufficiently small, the throat nozzle 50 is unnecessary.

The inventor actually performed an experiment of boring a hole of 9.5mm to 14.5mm in diameter in a concrete material, using the drilling device having the capability of spouting the atomized water at 5 cc/sec and the throat nozzles 40, 50 inserted in the mist path as noted above. As a result, it has been noticed that the drilling device of this invention can spout substantially instantaneously the atomized water from the leading end of the drill merely 0.5–0.7 seconds after the drill is driven. Without the throat nozzle, it has taken 5 to 20 seconds until the time the atomized water is spouted out. Thus, the experiment has conclusively proved that the drilling device of this invention can give better response times of spouting the atomized water from the drill.

Though the drilling device in the illustrated embodiment uses a non-core drill, it can be readily applied to a core drill type as a matter of course.

The Fifth Embodiment

Figure 9:
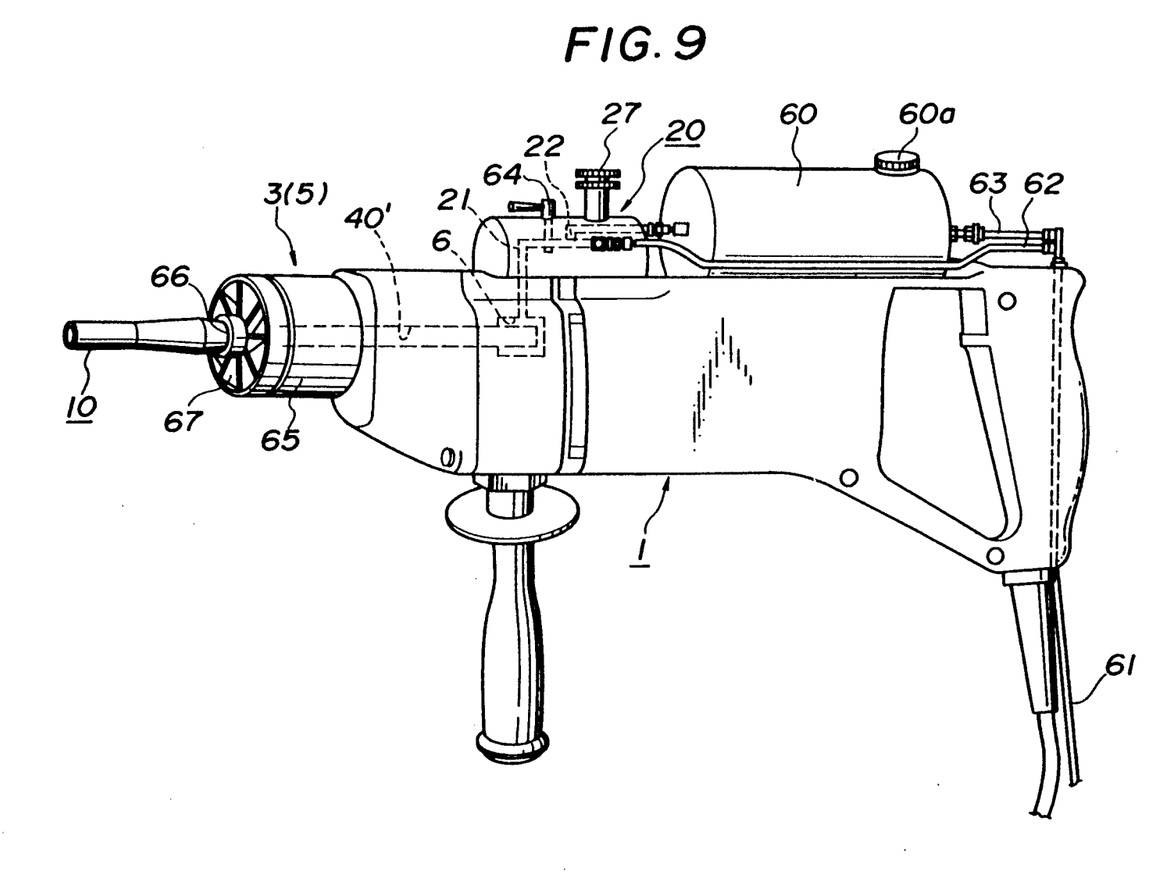
FIG. 9 is an explanatory diagram of a fifth embodiment of this invention.

FIG. 9 illustrates a fifth embodiment in which a feed water tank 60 is mounted on the drill driving means 1 along with the atomizing means 20. To the atomizing means 20 and the feed water tank 60, compressed air is supplied via a cabtyre pipe 61 and feed air pipes 62, 63 so as to give air pressure for sending out the water in the feed water tank 60 and further spray the water into atomized water in the atomizing means 20. The water required can be supplied to the feed water tank 60 from a feed water mouth 60a. The feed water tank 60 may be detachably fixed on the drill driving means 1.

This embodiment is substantially similar in structure to the foregoing embodiments except a regulating valve 64 is disposed on the atomizing means 20 for controlling the flow quantity of the atomized water flowing out from the atomizing means 20. By the regulating valve 64, the control of supplying the atomized water can be easily effected.

Moreover, the drilling device in the illustrated embodiment has a chip-free cover 65 covering the drill holding portion 3 and a chip removing fan 67 which is fixed to a rotary shaft 66 for blowing away cutting chips produced in drilling. These chip-free members permit a significant improvement in the efficiency of work involved in drilling a concrete material. Since the other elements of the drill driving means are identical to the previously described modification, like elements are given like reference numeral.

Advantage of the Invention

As described above, the mist-spouting type drilling device according to the present invention can apply atomized water so as to permit a cutting bit of a drill to effectively cool the drill in drilling a rigid material of concrete or the like, whereby the rigid material can be effectively bored to make a hole without being stained with wetting. Thus, the present invention can provide the drilling device possessed of the merits of both the drilling devices of water-cooling type and air-cooling type.

Obviously many modifications and variations of the present invention are possible in the light of the above teachings. It is therefore to be understood that, within the scope of the appended claims in the invention may be practiced otherwise than as specifically described.

What is claimed is:

1. A portable drilling device comprising:
   (a) a rotary drill having:
      (i) a cutting bit at its distal end;
      (ii) a mist flow passage extending its axial length;
      (iii) at least one aperture in its distal end for the ejection of mist, said at least one aperture being in communication with said mist flow passage; and
      (iv) an aperture at its proximal end for the introduction of mist into said mist flow passage, said aperture being in fluid communication with said mist flow passage;
   (b) a drill driving means having:
      (i) first means for detachably gripping said rotary drill;
      (ii) second means for rotating said rotary drill;
      (iii) a mist chamber in fluid communication with said aperture in the proximal end of said rotary drill when said rotary drill is gripped by said first means; and
      (iv) a mist supplying hole leading from the exterior of said drill driving means to said mist chamber;
   (c) third means for atomizing water to create mist, said third means being;
      (i) in fluid communication with said mist supplying hole and
      (ii) integrally mounted on said drill driving means;
   (d) a throat nozzle received in said mist flow passage; and
   (e) an elastic sleeve disposed between said throat nozzle and said mist flow passage in tightly contacting engagement with each.

2. A drilling device as recited in claim 1 wherein said third means is connected to said mist supplying hole by a joint pipe.

3. A drilling device as recited in claim 1 wherein said rotary drill is a core drills.

4. A drilling device as recited in claim 1 wherein said mist chamber and said mist flow passage are sized so that the mist is spouted out from the distal end of said rotary drill immediately after said drill driving means is driven.

5. A drill driving device as recited in claim 1 wherein:
   (a) said mist flow passage contains a taper which divides said mist flow passage into a smaller diameter section toward its distal end and a larger diameter section toward its proximal end;
   (b) said throat nozzle is received in said small diameter section of said mist flow passage; and
   (c) said elastic sleeve is disposed between said throat nozzle and said large diameter section of said mist flow passage in tightly contacting engagement with each.

6. A drilling device as recited in claim 1 and further comprising:
   (a) a feed water tank mounted on said drill driving means and in fluid communication with said third means and
   (b) a regulating valve downstream of said third means and upstream of said aperture in the proximal end of said rotary drill.

* * * * *